BEST AVAILABLE COPY
J. R. Steer,
Cotton Bale Tie.
No. 195. (Al.) Patented Mar. 23. 1858.
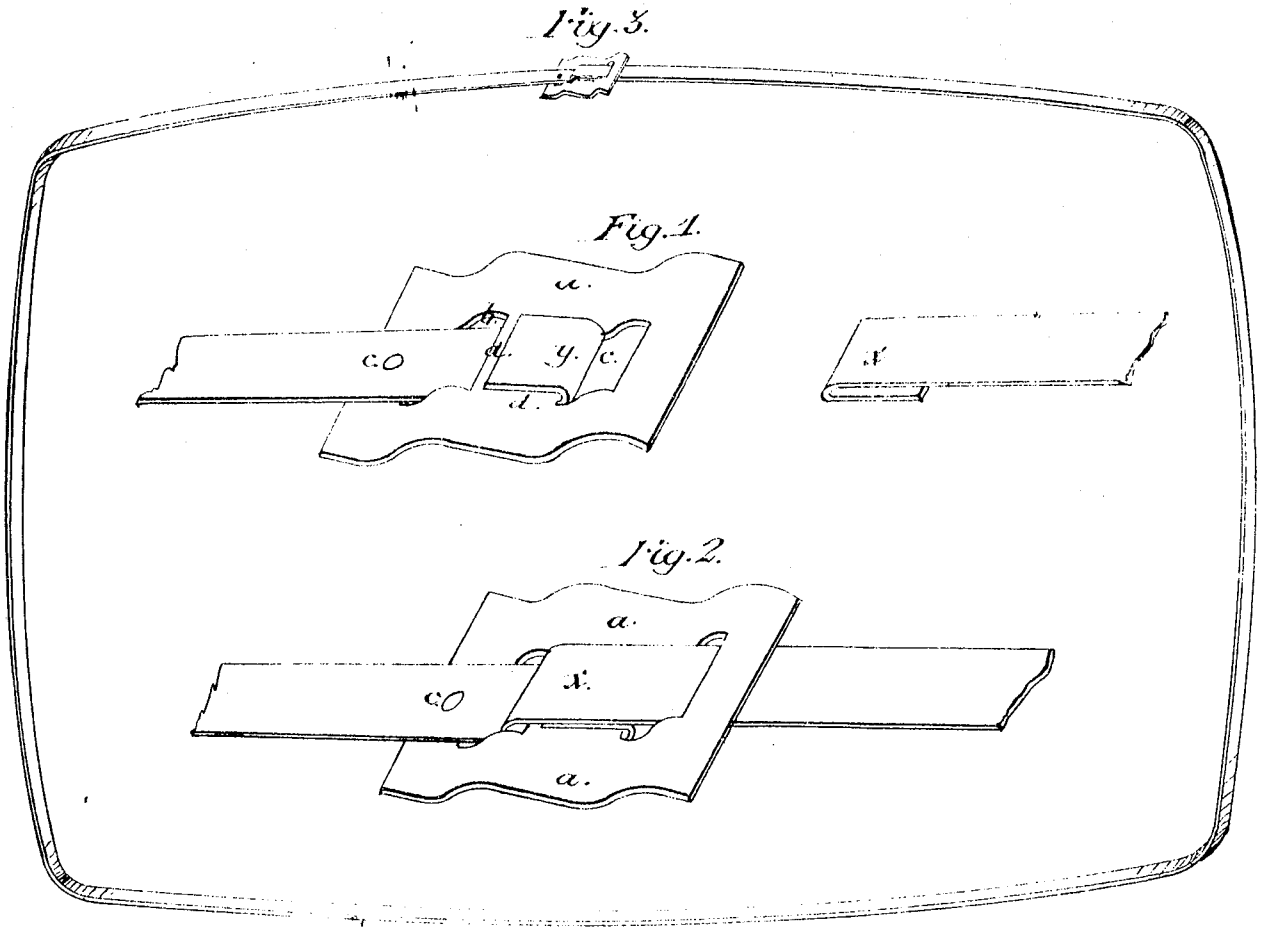
N. PETERS, PHOTO-LITHOGRAPHER, WASHINGTON, D. C.